United States Patent [19]

Taluba

[11] 4,143,453
[45] Mar. 13, 1979

[54] APPENDAGE SUCH AS A DOLL'S HEAD, A METHOD FOR BLOW MOLDING SAME OF ELASTOMER MATERIAL, AND A METHOD FOR SECURING SAME TO A BODY

[76] Inventor: Anthony P. Taluba, Lebanon, N.J.

[21] Appl. No.: 773,950

[22] Filed: Mar. 3, 1977

[51] Int. Cl.² .................. B23P 11/02; A63H 3/46; B29C 17/07
[52] U.S. Cl. .................................. 29/453; 29/805; 46/163; 46/164; 46/173; 264/533; 264/295; 264/296; 425/525; 264/540
[58] Field of Search .............. 264/89, 90, 92, 94, 264/96–99, 295, 296; 425/525; 46/163, 164, 173; 29/436, 437, 443, 450, 453, 805

[56] References Cited

U.S. PATENT DOCUMENTS

| 1,998,864 | 4/1935 | Dodge | 46/173 X |
| 2,967,330 | 1/1961 | Tommarchi | 264/98 |
| 3,015,856 | 1/1962 | Cohn | 264/94 |
| 3,195,269 | 7/1965 | Wein et al. | 46/163 X |
| 3,310,907 | 3/1967 | Robbins | 46/164 X |
| 3,540,150 | 11/1970 | Kosicki et al. | 46/173 X |
| 3,818,631 | 6/1974 | Cedarholm | 46/164 X |

Primary Examiner—Jan H. Silbaugh
Attorney, Agent, or Firm—Martha G. Pugh

[57] ABSTRACT

A hollow doll in which the doll's head is formed of elastomer material, and is blow molded to include a downwardly extended annular lip having a semicircular groove at the front of the neck. The lip is constructed to fold inwardly, and to engage a bead or flange on the neck portion of the body, thereby securing the head to the body. It is contemplated, in accordance with the present invention, that other appendages can be secured to a primary body in a similar manner.

12 Claims, 15 Drawing Figures

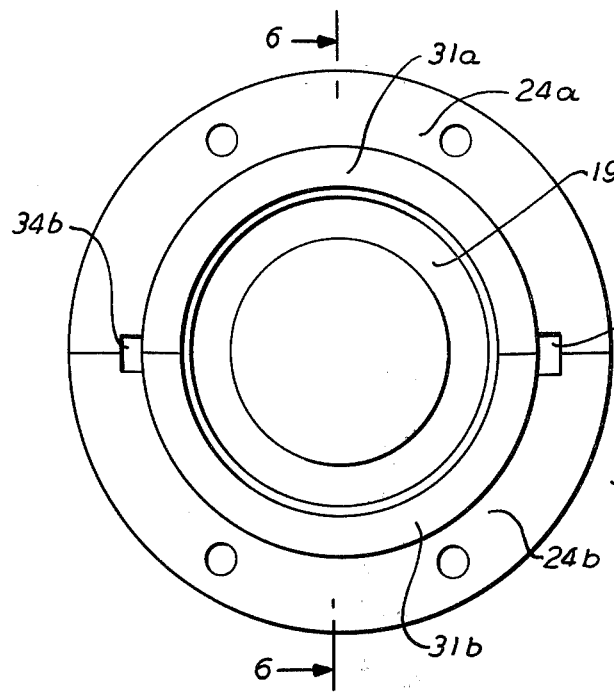
FIG. 3
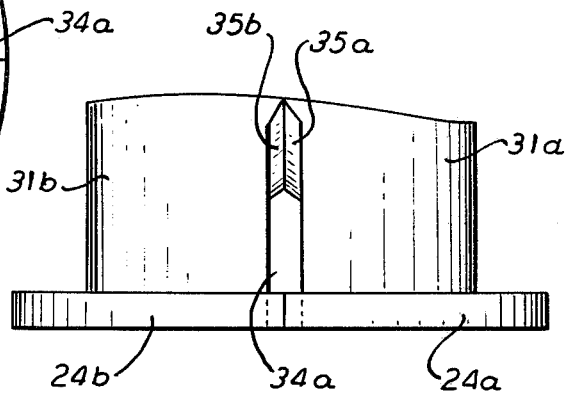
FIG. 4
FIG. 5
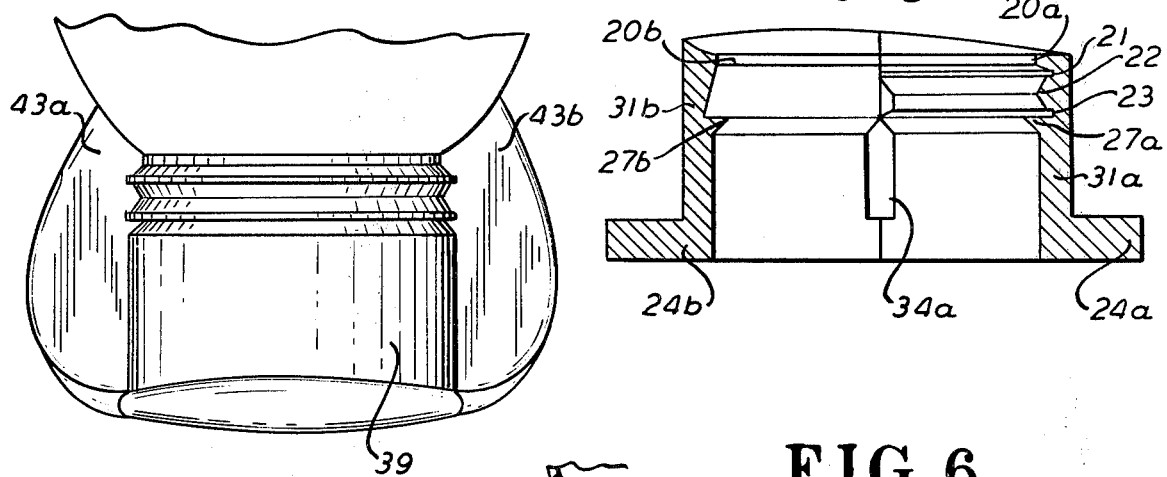
FIG. 7
FIG. 6
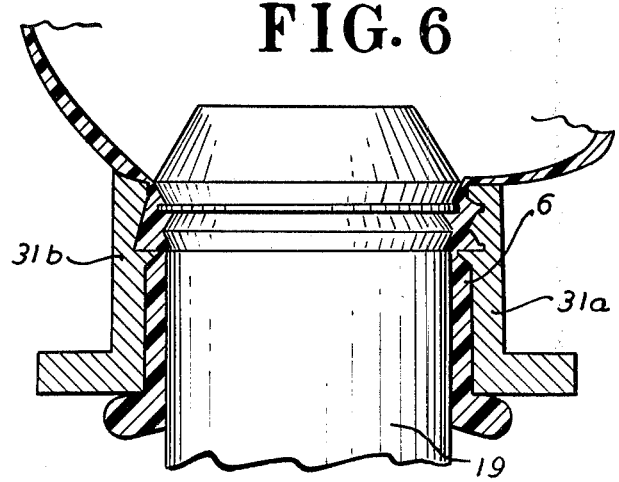

APPENDAGE SUCH AS A DOLL'S HEAD, A METHOD FOR BLOW MOLDING SAME OF ELASTOMER MATERIAL, AND A METHOD FOR SECURING SAME TO A BODY

BACKGROUND OF THE INVENTION

This relates in general to the blow molding of hollow toys of elastomer material, including their appendages; and, more particularly, to the blow molding of hollow dolls' heads of rubber, plastic or the like in a manner which will permit them to be readily secured to the body portion.

One of the problems in forming dolls and other hollow toys of real, synthetic rubber or plastic, is to be able to attach the head securely to the body, while still permitting the head to be moved rotatively relative to the body. It is contemplated that a similar problem may arise in the attachment of other appendages to a primary body.

In the assembly of certain types of prior art dolls of hollow plastic, real or synthetic rubber, the neck portion of the body is equipped with an outwardly extending annular flange which engages a round opening in the head. This is unsatisfactory, because the head and body easily come apart.

Another prior art method of securing the head to the doll's body employs internal blocks fitted into the neck and into the head, which have mating indentations and projections which fit together. This requires additional parts and handling by the operator during the assembly process. Also, the indentations and projections are of a type which wear with use, causing the head and body to eventually come apart.

SUMMARY OF THE INVENTION

Accordingly, it is a principal object of the present invention to provide improvements in the blow molding of hollow elastomer toys such as dolls; and, more particularly, to provide improved means and techniques for molding and applying appendages, such as dolls' heads, to the corresponding body portions.

These and other objects are attained in accordance with the present invention by blow molding a hollow appendage comprising elastomer material in such a manner that it is provided with an inwardly folding lip having a semiannular groove. The lip mates with a flange on the primary body. In the particular embodiment disclosed, the two halves of a doll's head are molded to include an annular lip at the neck constructed to fold inwardly along an annular groove when the two halves of the mold come together. An external semiannular projection and a semiannular indentation are provided on the face half of the lip, which are not matched on the rear half. The lip is constructed in its inwardly folded position so that its upper edge mates with an annular flange on the doll's body, securing the head thereto.

Salient features of the present invention are its simplicity of manufcture and assembly; that it provides a secure, realistic looking attachment between head and neck without additional parts; and that it permits the head to be rotated relative to the body in a horizontal plane.

These and other objects, features and advantages of the invention will be better understood from a study of the specification hereinafter with reference to the attached drawings.

BRIEF DESCRIPTION OF THE DRAWINGS

FIG. 3 is a view looking up from the bottom of the inserts for the face and rear mold halves in accordance with the present invention, disposed in closed relation;

FIG. 4 is a side elevation of the inserts of FIG. 3 for the face and rear mold halves, viewed along the centerline between the two;

FIG. 5 is a diametrical section of FIG. 4, showing the internal outlines of the front and rear inserts;

FIG. 6 is a view of the modified inserts of FIG. 5 with the modified blow pin in place, squeezing the molten rubber parison into position;

FIG. 7 is a fragmentary front view of the product removed from the insert portion of the mold shown in FIG. 2A, including the attached "flash";

DETAILED DESCRIPTION

It will be understood that the present invention applies to any toy or other air-filled body of elastomer or plastic material, formed by any conventional molding process (but preferably by blow molding), which body has appendages adapted to be rotatably secured to an opening of the primary body.

An illustrative example will be described with reference to a doll's head which is formed for attachment to the body portion of a conventional doll.

Figure 1A:
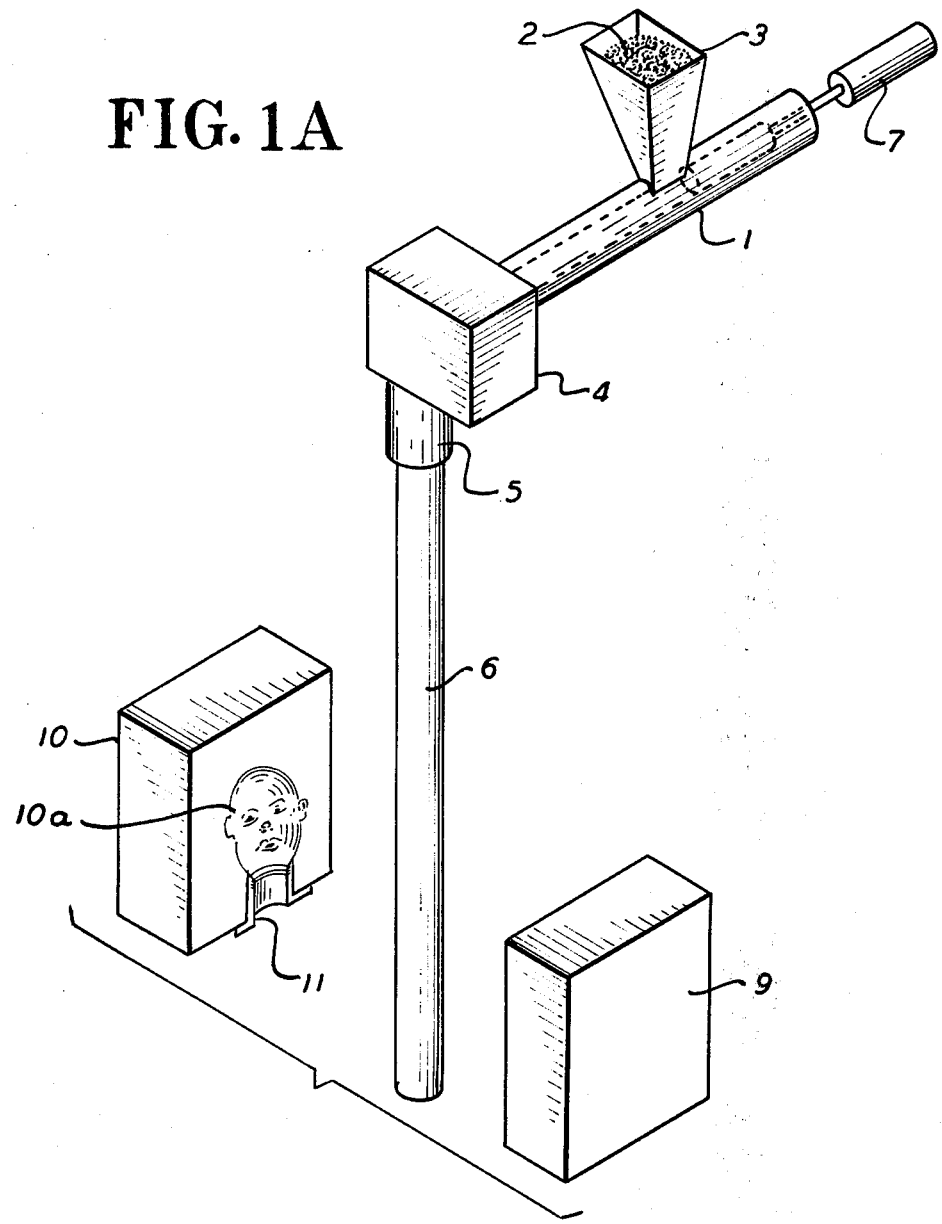
FIG. 1A is a schematic showing of a conventional prior art blow molding system for forming a doll's head.

Referring to FIG. 1A of the drawings, a conventional system for blow molding a doll's head is shown schematically. This may comprise a plasticizer in the form of a cylindrical chamber 1, in which pellets 2 of elastomer, dumped in through a funnel-shaped input chute 3, are heated electrically to a temperature of between 325° F. and 350° F. to produce a molten plastic mass. A hydraulically actuated plunger 7 (or, alternatively, a screw mechanism) forces the molten plastic through the extrusion head 4, to which is attached a tube die 5. A tube (parison) 6 of plastic or elastomer material, about ¾ inch in outer diameter, having a wall thickness of about 35 mils, is continuously extruded from the latter.

To form the doll's head, the parison 6 is clamped between the faces of a pair of molds 9 and 10, including mold cavities 9a (not shown) and 10a, which form the back of the head and face, respectively. An insert 11 is centered below the neck opening of face cavity 10a, a similar insert being disposed in a corresponding position on mold 9, so that when the molds 9 and 10 are closed face-to-face, the insert 11 and its companion enclose a blow pin 18 in which air is brought into the system to inflate the parison 6.

Figure 1B:
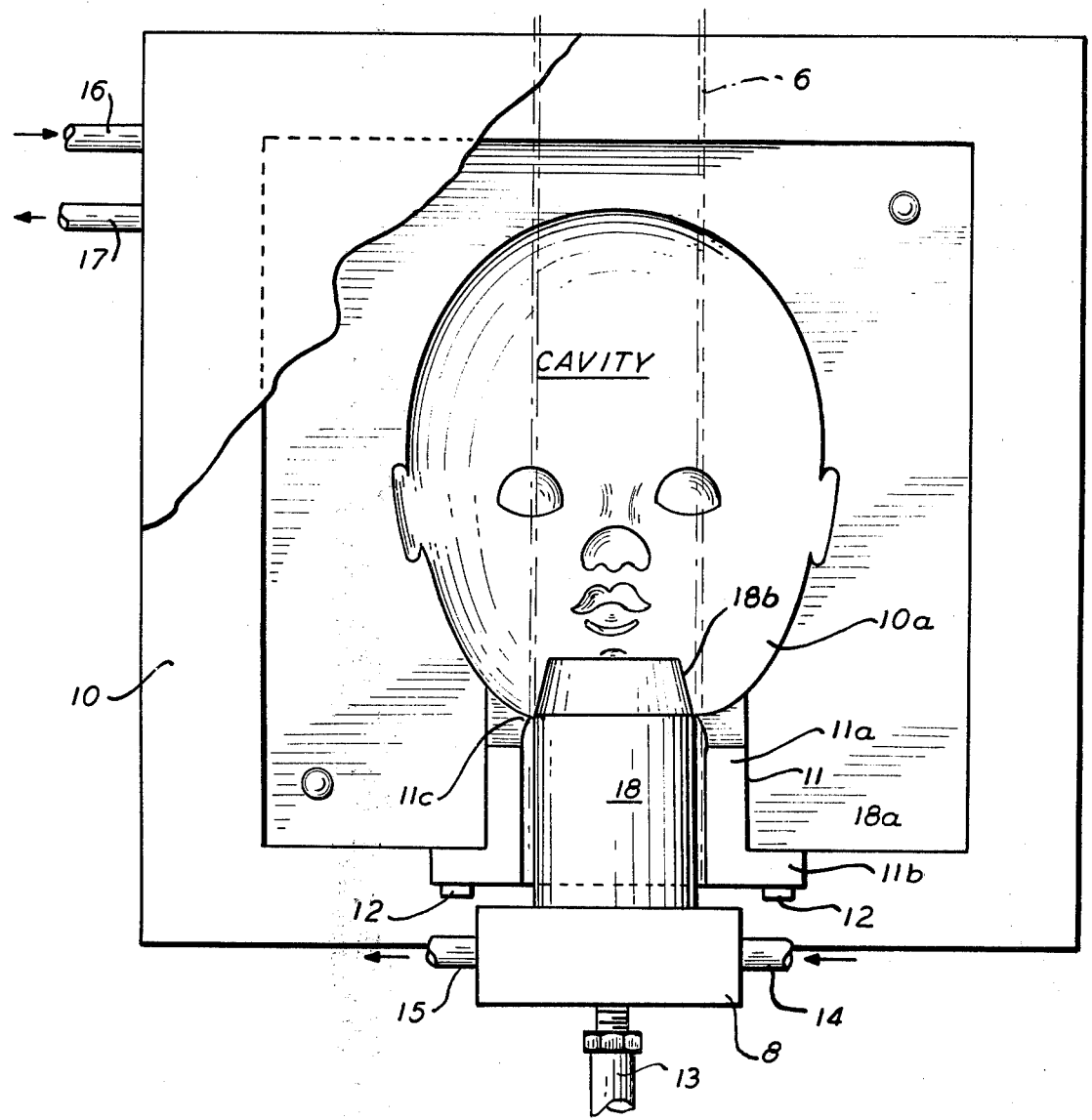
FIG. 1B shows a face half of the mold of FIG. 1A, including a conventional blow pin of the type used in the prior art for blow molding dolls' heads.

FIG. 1B shows the cavity in its prior art form, for blow molding the face portion of the doll's head in an enlarged view, with its open face up. This comprises a block 10, preferably of aluminum or of beryllium copper or zinc alloy, which is, say, 6 inches long, 6 inches wide and 4 inches deep, including a cavity 10a formed in the inverse shape of the doll's face, which has been foundry cast in a conventional manner, and then machined to a desired pattern, including pinch-offs. It is contemplated that the mold may be formed and the blow molding operation carried out in any manner well-known in the art, such as described, for example, in Chapter 12 of PLASTICS MOLD ENGINEERING, Revised Edition, edited by J. H. DuBois and W. I. Pribble, Rheinhold Publishing Corporation, New York, 1965.

The prior art type insert 11, which is centered in the mold in the position of the neck opening of cavity 10a, is in the form of a semicylinder, two inches in inner diameter, 2⅜ inches in outer diameter and 1⅜ inches along the axis, being slightly inwardly bevelled along the top edge, and terminating at the lower edge in an annular flange 11b which is ¼ inch thick, and extends ½ inch out from the outer surface of the cylinder. This is fitted into a semicylindrical cavity centered below the chin portion of cavity 10a, and fastened into place by several screws 12 interposed through screw holes in flange 11b. A substantially identical matching insert is fastened into the inner face of mold 9. When the two halves of the mold come together to clamp the parison 6 between them, they form a sleeve for the blow pin 18, which moves up inside of the parison, the latter being squeezed between the outer periphery of the blow pin and the inner periphery of the inserts. The position of parison 6 is shown in dotted lines in FIG. 1B.

The block 10 is cooled by refrigerated water passing at a temperature between 35° F. and 40° F. through pipe 16, which is connected to a system of pipes crisscrossing the block and passing out through pipe 17. The blow pin 18 is cooled by water from the same source, passing in through pipe 14 and out through pipe 15.

The conventional blow pin 18 has a cylindrical body which is just under 2 inches in outer diameter and about 2 inches long. This has a central bore (not shown) ⅜ inch in diameter, terminating at its lower end in the head 8, which takes the form of a rectangular block in which is centered the conventional air intake pipe 13, which is connected directly to the pneumatic system of a conventional molding machine. The upper end of blow pin 18, which penetrates into the neck portion 11c, is inwardly tapered in frustoconical form. It serves as a vehicle for a blast of air which passes into the mold at, say, 35–40 pounds per square inch, for a period of from, say, 10 to 14 seconds, when the mold closes. The operation of this air blast is controlled by conventional solenoid valve means operated in accordance with a time cycle set up on the control panel of the conventional molding machine, which has not been shown. The air blast cuts off while the machine is still closed, and before the mold opens up. After the mold opens up, the blow pin 18 is retracted, and the product head is contacted in a conventional operation by a stripper plate (not shown) simultaneously with a second blast from a nozzle connected to the pneumatic system of the conventional molding machine outside of the mold, which blows the product into a collector bin.

Although any suitable rubber, synthetic rubber or elastomer material may be used for the product of the present invention, a material which is particularly adapted for this purpose is a thermoplastic rubber manufactured by the Shell Chemical Company under the trademark "KRATON". This is a thermoplastic block copolymer of styrene and butadiene which combines the resilience and elasticity of vulcanized rubber with thermoplastic processing techniques, achieved without vulcanization. The composition, characteristics and method of making this material are more particularly described in U.S. Pat. No. 3,265,765, issued Aug. 9, 1966 to Geoffrey Holden and Ralph Milkovich, assignors to Shell Oil Company. An alternative material is a synthetic rubber which is a product of styrene and butadiene manufactured by Phillips Chemical Company under the trademark "SOLPRENE".

It will be understood that any other plastic or synthetic rubber material can be employed for the purposes of the present invention, provided it cures to a body having the desired flexibility. For use in toys, the material must also be nontoxic.

Figure 2B:
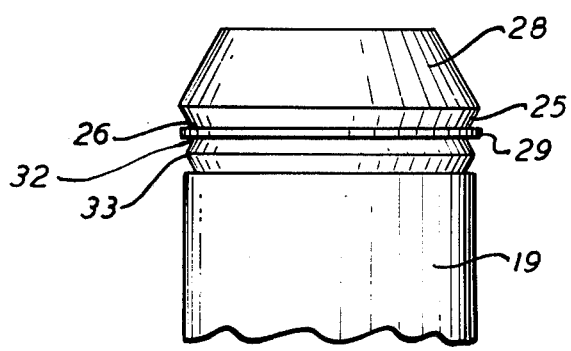
FIG. 2B is a showing in side elevation of the blow pin of FIG. 2A, removed from the inserts.
Figure 2A:
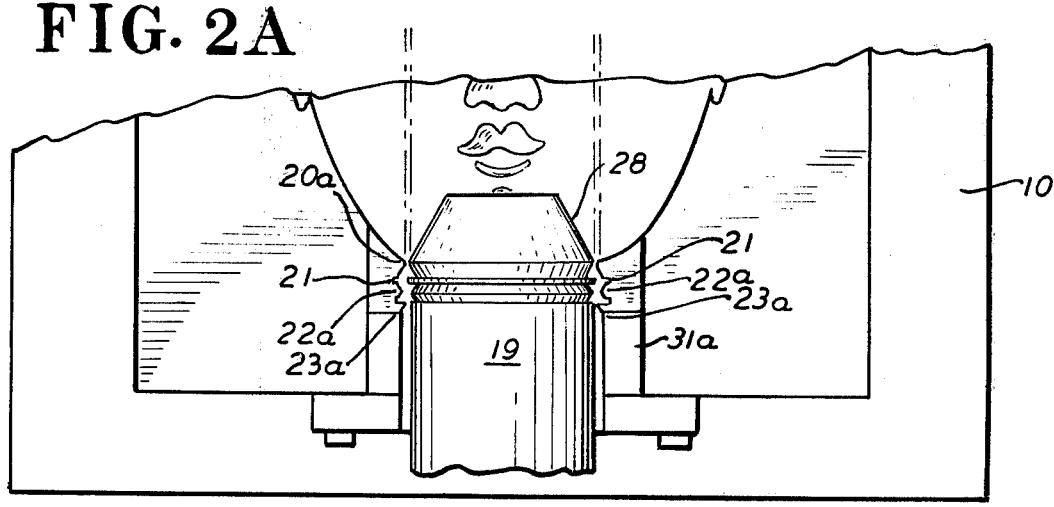
FIG. 2A is a fragmentary showing of a face half of the mold, including a neck insert and blow pin, both modified in accordance with the present invention to produce a doll's head having a grooved lip at the neck.

In accordance with the present invention, as shown in FIG. 2A, both the blow pin and the insert have been modified, so that the product doll's head, instead of being cut off at the neck opening, is blow molded to include an annular lip, in which there is a slight difference between the front semicircle and the rear semicircle, as will be explained.

In accordance with FIG. 2A, the blow pin 19 replaces the blow pin 18 of FIG. 1; and on the face half of the mold the insert 31a replaces the insert 11a. A corresponding insert half 31b replaces the corresponding half of insert 11a. The positions and shapes of these inserts are more clearly shown in FIG. 3 (bottom view), FIG. 4 (side elevation) and FIG. 5 (diametrical section).

As shown in FIG. 2B, in side elevation, the modified blow pin 19 has an annular land 25 just below the frustoconical top 28, which is ⅛ inch wide, and inwardly bevelled around the lower periphery to provide an annular groove 26, 1/16 inch deep. Below this is an annular ring 29 having a rectangular cross-section, projecting peripherally 1/32 inch from groove 26, having a thickness, say, 1/16 in a vertical plane, and bounded on its lower edge by a horizontally extending plane 1/16 inch wide, which provides a second annular groove 32. This is bounded on its lower periphery by an annular convex projection 33 which extends down, say, ⅜ inch, so that its lower surface bears against the flat horizontally projecting edge of inserts 31a, 31b. The blow pin 19 is symmetrical about its longitudinal axis.

FIG. 3 is a view, looking up from the bottom at the annular flanges 24a and 24b of inserts 31a and 31b, respectively, while they are clamped in place around the blow pin 19. The inner diameter of the sleeve formed by inserts 31a and 31b in closed relationship, clamping blow pin 19, is 2 inches; and the outer diameter of the combined flanges 24a, 24b is 3⅜ inches. The upper edges of the respective semicylinders 31a,31b form a circle 2½ inches in outer diameter. They are bevelled inwardly to accommodate the neck portion of the doll's head being molded.

Referring to FIG. 4, the closed inserts 31a and 31b are shown in side elevation, looking at the line of contact between them. It is seen that the lower flanges 24a and 24b come together in flush relationship, as do the inwardly bevelled upper edges 35a,35b and 35c,35d (the latter two not shown). These two pairs of diametrically opposite bevels are in contact to a depth of about ½ inch below the top, leaving lateral openings 34a,34b (not shown) which are about ¼ inch wide, and extend about ⅜ inch to the upper faces of flanges 24a and 24b. The diametrically opposite sides of closed inserts 31a,31b are symmetrical.

In accordance with the present invention, the rear insert 31b differs from front insert 31a, as shown by a comparison of their internal sections in FIG. 5.

Referring to the right-hand side of FIG. 5, corresponding to the face, at the upper end of the modified insert half 31a, the smooth internal semicylinder wall has been machined to include an annular land 20a, say, ⅛ inch wide, below which is a semiannular groove 21, which is ⅛ inch wide and, say, 1/16 inch deep. Groove 21 is bounded on its lower periphery by a semiannular ring 22, about ¼ inch in cross-section, which at its periphery is slightly larger in inner diameter than that of land 20a. The under edge of semiannular ring 22 is bevelled convexly at an angle of about 30° with the vertical to form another semiannular groove 23, which is 3/32 inch deep, and is bounded around its lower periphery by a sharply projecting annular flange 27a which provides a semiannular surface 3/32 inch wide, facing upward in a horizontal plane.

Referring to the left-hand side of FIG. 5 which corresponds to the back of the head, on insert 31b, the land portion 20b conforms to land portion 20a on insert 31a, providing a 360° annular land when the inserts are together; and projecting flange 27b conforms to projecting flange 27a on the face portion of the insert. On the insert 31b, however, the portion between 20b and 27b is substantially cylindrical, there being no ring corresponding to 22 on the front insert 31a. Together 20a and 20b form an annular plane extending 360°. Inwardly directed projections 27a, 27b form between them a projecting horizontal flange extending 360°.

FIG. 6 is a sectional showing of the softened parison 6, after it has been gripped between blow pin 19 and the inserts 31a, 31b, positioned as shown in FIG. 5.

Figure 8:
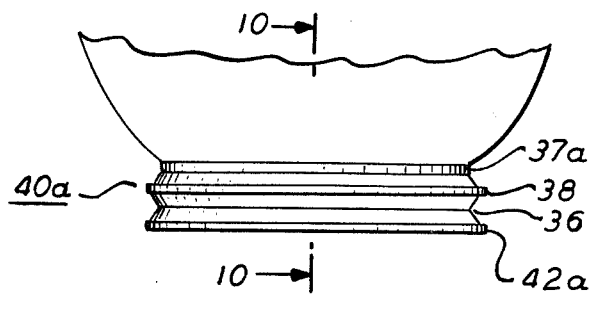
FIG. 8 is a fragmentary showing from the front of the product shown in FIG. 7, with the flash portions removed.
Figure 10:
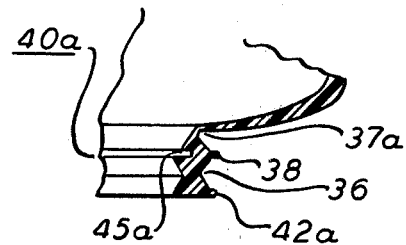
FIG. 10 is a showing, in section, along the plane indicated by the arrows 10—10 of FIG. 8, of the front portion of the lip formed by the insert.
Figure 9:
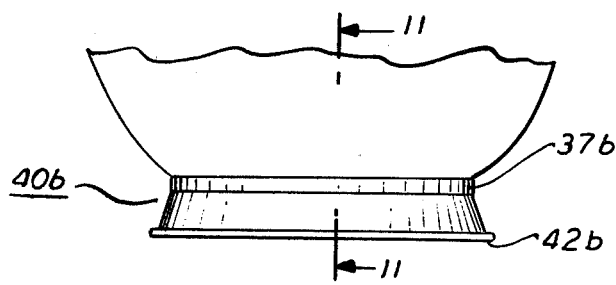
FIG. 9 is a fragmentary showing from the rear of the product of the insert portion of the mold, with the flash removed.
Figure 11:
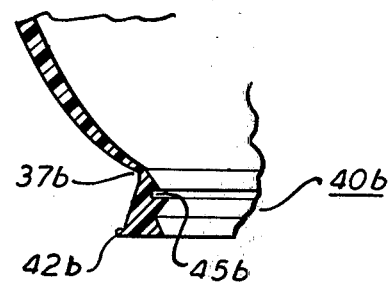
FIG. 11 is a showing, in section, along the plane indicated by the arrows 11—11 of FIG. 9, of the rear portion of the lip formed by the insert.

FIG. 7 is a front view of the product after it has been removed from the mold, including "flashes" 43a and 43b, comprising excess plastic material which is forced out of the closed mold through the openings 34a and 34b during the molding process. These flashes 43a and 43b and the skirt 39 are readily removed, providing a product corresponding to the fragment of the lower face of the doll's head, as shown in FIG. 8, and the fragment of the back of the doll's head, as shown in FIG. 9. Referring to FIG. 8, the lip 40a on the face portion includes groove 37a adjacent the neck, semiannular ridge 38 surrounding the lower edge of groove 37a, semiannular indentation 36 and the flanged lower edge 42a, all of which are shown in section in FIG. 10. The latter shows internal groove 45a adjacent external projection 38. The product corresponding to the rear of the head shown in FIG. 9 has an annular groove 37b which is a continuation of groove 37a; and bead 42b which is a continuation of bead 42a. These are shown in section in FIG. 11, which also shows internal groove 45b, a continuation of 45a.

Figure 12:
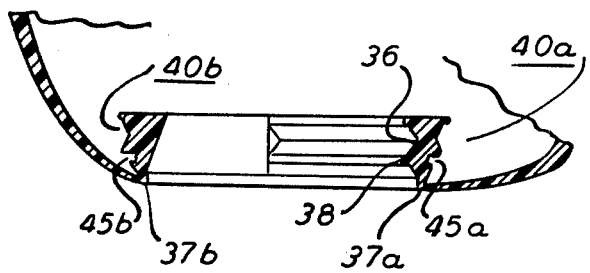
FIG. 12 is a showing, in section, of the lip inwardly folded at the interface between the front and rear portions of the lip.

During the molding process, the two halves of the head are joined together, so that the front and rear portions form a single annular lip 40a,40b, as shown folded inwardly in FIG. 12, the principal difference between the rear and front being the semiannular projecting ridge 38 and the indentation 36 on the latter.

Figure 13:
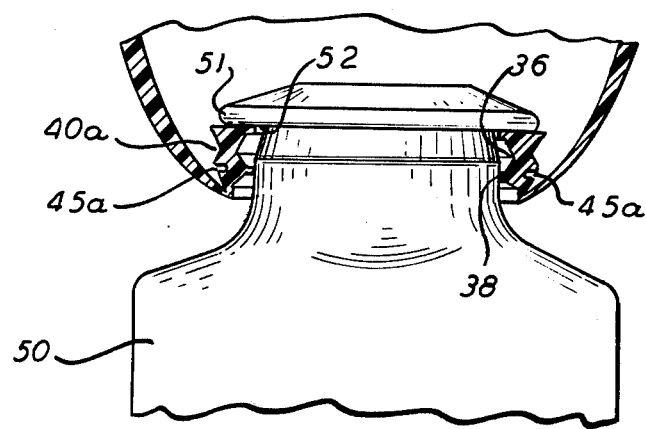
FIG. 13 is a showing, in section, looking from the back to the front, of the inwardly folded lip, secured under the outwardly directed flange of the neck portion of the doll's body.

Referring to FIG. 13, a conventional torso 50, which may be formed of any well-known elastomer or, alternatively, of a rigid plastic material such as, for example, linear polyethylene material, includes an annular flange 51 at the neck, which may, for example, be, say, 3/16 inch thick in a vertical direction. Flange 51 is substantially flat on its upper surface, and provides an annular horizontal plane on its under edge surface, approximately 3/16 inch wide, which is cut back to an annular groove 52.

In FIG. 13, which is a section looking from the rear to the front, the front portion of the annular lip 40a is folded inward along the annular groove 37a as indicated in FIG. 12. The lower face of flange 51 rests on the top edge of the inwardly folded lip 40a.

The internal annular groove 45a and the semiannular indentation 36 formed on lip 40a enable the chin of the head to tip slightly forward, to rest against the neck of the body in natural fashion. The lip 40a holds the head securely on the body so it is not readily disengaged, but permits the head to be rotated relative to the body. As noted from FIG. 12, no indentation corresponding to 36 is on the rear lip 40b, as its presence would prevent the head from tipping slightly forward.

In order to remove the shine from the molded doll's head, which may be formed of synthetic rubber or plastic material such as that known by the trademarks KRATON or SOLPRENE, as previously described, the head may be tumbled, after molding, or sand blasted in a closed chamber with apricot pits ground to the fineness of ordinary sand. The ground apricot pits are applied with a blast of air at a pressure of about 50 pounds per square inch. The heads are free from the powdered blasting material after completion of this process, and have the shine removed, providing a matte surface which resembles a baby's skin, and lends itself well to the application of color.

The invention described in the foregoing pages is not limited to the specific forms, materials or dimensions described by way of illustration, but only by the scope of the attached claims.

What is claimed is:

1. The method of molding a hollow elastomer appendage for attachment to a body including a substantially circular outwardly directed flange at the attachment site which comprises the method steps of:

molding said appendage to include an annular lip integral with the perimeter of an opening in said appendage, said lip molded to include at least one groove around the perimeter of said opening, folding said grooved lip on said one groove into said opening, whereby in said folded relation an upper edge of said lip is constructed to engage an under surface of said flange.

2. The method of forming a doll's head in accordance with claim 1, wherein said doll's head is blow molded in a mold comprising two mating cavities, each including a semicircular insert at the neck portion thereof, modifying the semicircular insert at the neck portion of each of said cavities to form between their inner surfaces an annular flange having an inwardly projecting annular plane immediately adjacent said neck, and an inwardly projected annular ridge disposed below said plane, and substantially spaced apart from said plane.

3. The method in accordance with claim 2 which includes forming on the inner surface of the insert adjacent the face portion of said mold a semiannular inwardly projecting ridge between said annular plane and said annular ridge, said semiannular ridge being bounded above and below by a pair of semiannular grooves.

4. The method of fabricating a hollow body of elastomer material comprising a molded primary body and one or more separately molded hollow appendages which comprises the steps of:

molding the primary body to include a connecting member having an outwardly directed substantially circular annular flange at the site of attachment of one said appendage, molding a hollow appendange to include a substantially circular opening formed for attachment to the flanged connecting member of said primary body, forming simultaneously with the molding of said appendage an annular lip depending from the opening in said appendage, said lip having at least one annular groove and being constructed to fold on said one groove into the opening of said appendage, and assembling said primary body and said hollow appendage by engaging an upper edge of said inwardly folded lip in mating relation with at least a portion of the outwardly directed annular flange of the connecting member of said primary body.

5. The method of molding a hollow doll's head of elastomer material, which comprises molding said head to have a substantially circular opening at the neck for attachment to a body having a neck portion terminating in an outwardly extending annular flange, which comprises the steps of:

molding an annular downwardly depending lip around the periphery of said neck opening, forming on said lip a substantially flat annular bottom surface, molding at least one annular groove in said lip immediately adjacent said opening, molding a semiannular external ridge into a face portion of said lip adjacent the lower periphery of said one groove, forming semiannular internal and external indentations in said lip adjacent said semiannular external ridge, and forming an annular bead or ridge near the lower edge of said lip, said lip being constructed to fold inwardly on said one annular groove so that the flat annular surface on the bottom of said lip engages and serves as a bearing for the underside of the annular flange on the neck portion of said body.

6. A hollow elastomer appendage with an opening at one end for attachment to a body, said body having a circular outwardly extending flange at the site of attachment of said appendage to said body, said appendage comprising in combination:

an annular lip molded integrally with said opening and having at least one groove around the perimeter of said opening, said lip being folded inwardly on said one groove to provide by its upturned edge an internal annulus for engagement with the lower surface of the outwardly extending flange of said body, thereby to secure said appendage in rotatable relationship relative to said body.

7. A combination in accordance with claim 6 wherein said lip provides a substantially flat annular bottom surface which is constructed to engage the underside of said flange of said neck portion upon folding inwardly and to serve as a bearing for the rotation of said head relative to said body.

8. A combination in accordance with claim 6 wherein said appendage is a hollow doll's head of elastomer material having a round neck opening for attachment to a doll's body having a neck terminating in a circular outwardly extending flange, said annular lip being molded integrally with the neck opening of said doll's head, said lip being constructed and arranged to fold inwardly on said one groove to provide an internal annulus for engagement with the circular outwardly extending flange on said neck portion, thereby to rotatably secure said head to said body.

9. A combination in accordance with claim 8 wherein said lip includes a second internal annular groove disposed below said first annular groove prior to folding.

10. A hollow elastomer doll's head with a round neck opening at one end for attachment to a doll's body having a neck terminating in a circular outwardly extending flange at the site of attachment of said head to said body, said head comprising in combination:

an annular lip molded integrally with said opening and having at least one groove around the perimeter of said opening, said lip being constructed and arranged to fold inwardly on said one groove to provide an internal annulus for engagement with the lower surface of the circular outwardly extending flange of said neck portion thereby to secure said head in rotatable relationship relative to said neck, said lip including a second internal annular groove disposed below said first annular groove prior to folding, wherein a face portion of said lip includes an external semiannular ridge substantially adjacent said second internal annular groove, and external and internal semiannular indentations disposed below said ridge prior to folding, whereby when said lip is folded inwardly to engage the underside of the flange on said neck of said body portion the chin of said head is tipped in realistic fashion slightly forward on said body.

11. The combination in accordance with claim 10 wherein said doll's head consists essentially of a thermoplastic block copolymer of styrene and butadiene.

12. The combination in accordance with claim 11 wherein after molding said doll's head has been tumbled or air blasted in a closed chamber with apricot pits ground to the fineness of ordinary sand.

* * * * *